United States Patent [19]

Akagawa et al.

[11] Patent Number: 5,837,764
[45] Date of Patent: Nov. 17, 1998

[54] POLYPROPLYLENE RESIN COMPOSITION

[75] Inventors: Tomohiko Akagawa; Ikunori Sakai, both of Sakai; Saburo Hinenoya, Izumisano; Kaoru Inoue; Takao Nomura, both of Toyota; Takeyoshi Nishio, Okazaki, all of Japan

[73] Assignees: UBE Industries, Ltd., Ube; Toyota Jidosha Kabushiki Kaisha, Toyota, both of Japan

[21] Appl. No.: 757,607

[22] Filed: Nov. 29, 1996

[30] Foreign Application Priority Data

Dec. 1, 1995 [JP] Japan ................................. 7-314407
Sep. 10, 1996 [JP] Japan ................................. 8-238783

[51] Int. Cl.$^6$ ................................................ C08K 3/34
[52] U.S. Cl. ............................................... 524/451
[58] Field of Search .............................. 524/451

[56] References Cited

U.S. PATENT DOCUMENTS

| | | | |
|---|---|---|---|
| 4,439,573 | 3/1984 | Fukui et al. ............................. | 524/451 |
| 5,001,182 | 3/1991 | Maruya et al. ........................ | 524/427 |
| 5,045,589 | 9/1991 | Ueno ..................................... | 524/505 |
| 5,308,908 | 5/1994 | Fukui et al. ............................ | 524/451 |

FOREIGN PATENT DOCUMENTS 0 593 221 A2  4/1994  European Pat. Off. .
0 657 500 A1  6/1995  European Pat. Off. .

*Primary Examiner*—Kriellion S. Morgan
*Attorney, Agent, or Firm*—Armstrong, Westerman, Hattori, McLeland & Naughton

[57] ABSTRACT

A polypropylene resin composition comprising the following components (A), (B), (C) and (D): (A) a crystalline ethylene-propylene block copolymer containing a room-temperature-p-xylene-soluble fraction Ac having an ethylene content of 12–26% by weight and an intrinsic viscosity (measured at 135° C. in decalin) of 6 dl/g or more, (B) a crystalline ethylene-propylene block copolymer containing a room-temperature-p-xylene-soluble fraction Bc having an ethylene content of 27–50% by weight and an intrinsic viscosity (measured at 135° C. in decalin) of 4 dl/g or less, (C) an ethylene-α-olefin copolymer obtained by polymerization using a single-site catalyst, having a molecular weight distribution (Mw/Mn) of 2.5 or less, a melt flow ratio ($MI_{10}/MI_{2.16}$) of 6–15 (wherein $MI_{10}$ is a melt index measured at 190° C. under a load of 10 kg and $MI_{2.16}$ is a melt index measured at 190° C. under a load of 2.16 kg) and an α-olefin proportion of 70 mole % or less, and (D) a talc having an average particle diameter of 3–7 μm as measured by laser diffraction. In the composition the weight ratios As and Bs of the room-temperature-p-xylene-soluble fractions Ac and Bc to the total weight of the components (A) and (B) satisfy the following formulas (1) and (2):

$$As+Bs=7–15\% \text{ by weight} \quad (1)$$
$$As/(As+Bs)=0.1–0.6 \quad (2)$$

The polypropylene component contained in each of the components (A) and (B) has an isotactic pentad fraction (mmmm) of 96% or more, and the mixture of the components (A) and (B) has a melt flow rate (measured at 230° C. under a load of 2,160 g) of 30–70 g/10-min, the total content of the components (A) and (B) is 50–80% by weight, the content of the component (C) is 5–20% by weight, and the content of the component (D) is 15–30% by weight, and the composition comprising the components (A), (B), (C) and (D) has a melt flow rate (measured at 230° C. under a load of 2,160 g) of 25 g/10-min or more. The composition is superior in stiffness, resistance to heat deformation, impact resistance and moldability and can provide a molded article of good appearance.

7 Claims, No Drawings ical POLYPROPLYLENE RESIN COMPOSITION

BACKGROUND OF THE INVENTION

1. Field of the Invention

The present invention relates to a polypropylene resin composition which is superior in stiffness, resistance to heat deformation, impact resistance and moldability and which can provide a molded article of good appearance. The present polypropylene resin composition can be suitably used in automobile interior parts such as instrument panels, trims and the like.

2. Description of Related Art

Polypropylene resin compositions, which are a combination of a polypropylene resin (e.g. a crystalline ethylene-propylene block copolymer) as a main component, an elastomer (e.g. an ethylene-propylene rubber, an ethylene-butene rubber or a hydrogenated styrene-butadiene block copolymer) and an inorganic filler (e.g. talc), have been widely used in automobile parts for their excellent stiffness, impact resistance and moldability.

For these polypropylene resin compositions, various investigations have been made to improve their stiffness, impact resistance, moldability, etc. by changing the kinds of the component(s), i.e. the polypropylene resin, elastomer and/or inorganic filler all used therein.

As such a polypropylene resin composition, there was proposed a composition which is a combination of a crystalline ethylene-propylene block copolymer, a particular ethylene-α-olefin copolymer rubber and talc [Japanese Patent Application Kokai (Laid-Open) No. 58-168649].

It was also investigated to combine a crystalline ethylene-propylene block copolymer with a particular hydrogenated styrene-butadiene block copolymer, an ethylene-propylene rubber and talc [Japanese Patent Application Kokai (Laid-Open) No. 3-172339].

It was also investigated to combine a crystalline ethylene-propylene block copolymer with a particular hydrogenated styrene-butadiene block copolymer, an ethylene-butene rubber and talc [Japanese Patent Application Kokai (Laid-Open) No. 4-57848].

In recent years, the polypropylene resin used in automobile interior parts such as instrument panels, trims and the like has been required to have, in addition to the high stiffness, high impact resistance and good moldability, high-quality appearance (for example, no flow mark and low luster) so as to enable coating-free operation for simplification of the step for parts production.

The above-mentioned polypropylene resin compositions have high mechanical properties but, with respect to the moldability, have no sufficient flowability. Increase in flowability alone reduces impact resistance significantly. Moreover, these compositions are not satisfactory in appearance quality (e.g. no flow mark and low surface luster) when used in automobile interior parts.

OBJECTS AND SUMMARY OF THE INVENTION

In view of the above-mentioned problems of the related art, an object of the present invention is to provide a polypropylene resin composition which is superior in stiffness, resistance to heat deformation, impact resistance and moldability and which can provide a molded article of good appearance.

In order to achieve the above object, the present inventor made a study on the optimization of (1) the polymer composition of crystalline ethylene-propylene block copolymer used as a main component and (2) the ethylene-α-olefin copolymer rubber added to the main component, in polypropylene resin composition.

As a result, the present inventor found out that by (a) using, in combination, two crystalline ethylene-propylene block copolymers each having a particular composition, in particular proportions and (b) using, together with the above two copolymers, an ethylene-α-olefin copolymer rubber and talc both having particular properties, there can be obtained a polypropylene resin composition which has high flowability, which is superior in stiffness, resistance to heat deformation and impact resistance, and which can provide a molded article having no flow mark and low luster, i.e. a molded article requiring no coating operation.

According to the present invention, there is provided a polypropylene resin composition comprising the following components (A), (B), (C) and (D):

(A) a crystalline ethylene-propylene block copolymer containing a room-temperature-p-xylene-soluble fraction Ac having an ethylene content of 15–26% by weight and an intrinsic viscosity (measured at 135° C. in decalin) of 6 dl/g or more, (B) a crystalline ethylene-propylene block copolymer containing a room-temperature-p-xylene-soluble fraction Bc having an ethylene content of 27–50% by weight and an intrinsic viscosity (measured at 135° C. in decalin) of 4 dl/g or less, (C) an ethylene-α-olefin copolymer obtained by polymerization using a single-site catalyst, having a molecular weight distribution (Mw/Mn) of 2.5 or less, a melt flow ratio ($MI_{10}/MI_{2.16}$) of 6–15 (wherein $MI_{10}$ is a melt index measured at 190° C. under a load of 10 kg and $MI_{2.16}$ is a melt index measured at 190° C. under a load of 2.16 kg) and an α-olefin proportion of 70 mole % or less, and (D) a talc having an average particle diameter of 3–7 μm as measured by laser diffraction, in which composition (a) the weight ratios As and Bs of the room-temperature-p-xylene-soluble fractions Ac and Bc to the total weight of the components (A) and (B) satisfy the following formulas (1) and (2):

$$As+Bs=7\text{--}15\% \text{ by weight} \quad (1)$$

$$As/(As+Bs)=0.1\text{--}0.6 \quad (2)$$

(b) the polypropylene component contained in each of the components (A) and (B) has an isotactic pentad fraction (mmmm) of 96% or more, and the mixture of the components (A) and (B) has a melt flow rate (measured at 230° C. under a load of 2,160 g) of 30–70 g/10-min, (c) the total content of the components (A) and (B) is 50–80% by weight, the content of the component (C) is 5–20% by weight, and the content of the component (D) is 15–30% by weight, and (d) the composition comprising the components (A), (B), (C) and (D) has a melt flow rate (measured at 230° C. under a load of 2,160 g) of 25 g/10-min or more.

DETAILED DESCRIPTION OF THE INVENTION

The present invention is hereinafter described in detail.

The components (A) and (B) used in the present resin composition are each a crystalline ethylene-propylene block copolymer. These crystalline ethylene-propylene block copolymers are each a mixture of a crystalline propylene homopolymer (hereinafter referred to as the polypropylene component) and an ethylene-propylene copolymer (hereinafter referred to as the E/P copolymer rubber). Each crystalline ethylene-propylene block copolymer is produced by two-step polymerization consisting of the first polymerization step of producing the polypropylene component and the second polymerization step of producing the E/P copolymer rubber. The polymerization is ordinarily conducted in the presence of a combination catalyst called Ziegler-Natta catalyst, consisting of titanium trichloride and an alkylaluminum compound, or in the presence of a composite catalyst of a magnesium compound and a titanium compound.

In the components (A) and (B) which are each a crystalline ethylene-propylene block copolymer, the polypropylene component contained in each of (A) and (B) has an isotactic pentad fraction (mmmm) of 96% or more, and the mixture of the components (A) and (B) has a melt flow rate (MFR) (230° C. under a load of 2,160 g) of 30–70 g/10-min.

Herein, the isotactic pentad fraction is a fraction, in crystalline polypropylene molecule chain, of the propylene monomer units present in the center of each isotactic pentad unit, i.e. each chain formed by meso bonding of five consecutive propylene monomer units, measured by $^{13}$C-NMR. The fraction is specifically determined as the fraction of mmmm peak in the total absorption peaks in the methyl carbon region of $^{13}$C-NMR spectrum.

When the mmmm is smaller than 96%, the resulting resin composition has low stiffness and heat resistance. When the MFR is smaller than 30 g/10-min, the resulting resin composition has low flowability and moldability and, moreover, generates flow marks and has inferior appearance. When the MFR is larger than 70 g/10-min, the resulting resin composition has low impact resistance.

The component (A) used in the present resin composition is a crystalline ethylene-propylene block copolymer satisfying the above mmmm and the above MFR, and its room-temperature-p-xylene-soluble fraction Ac has an ethylene content of 15–26% by weight, preferably 18–22% by weight and an intrinsic viscosity (measured at 135° C. in decalin) of 6 dl/g or more.

Also, the component (B) used in the present resin composition is a crystalline ethylene-propylene block copolymer satisfying the above mmmm and the above MFR similarly to the component (A), and its room-temperature-p-xylene-soluble fraction Bc has an ethylene content of 27–50% by weight, preferably 27–35% by weight and an intrinsic viscosity (measured at 135° C. in decalin) of 4 dl/g or less.

Herein, the room-temperature-p-xylene-soluble fraction refers to a polymer recovered as follows. First, 5 g of the crystalline ethylene-propylene block copolymer (A) or (B) is dissolved in boiling p-xylene for complete dissolution; the resulting solution is cooled to 23° C. and allowed to stand for 24 hours; the resulting material is filtered to remove the p-xylene insolubles; to the filtrate is added 1,500 cc of acetone, and the mixture is stirred to precipitate a polymer; then, filtration and drying are conducted to obtain a p-xylene-soluble polymer. The thus recovered room-temperature-p-xylene-soluble fraction is a fraction very close to the E/P copolymer rubber obtained in the above-mentioned second polymerization step.

The ethylene content of the room-temperature-p-xylene-soluble fraction is obtained by measuring the infrared absorption spectrum of a pressed film sample by the use of an infrared spectrophotometer and applying the obtained absorbances of the characteristic absorptions of methyl group ($-CH_3$, 1,155 $cm_{-1}$) and methylene group ($-CH_2-$) to the calibration curve of Gardner [I. J. Gardner et al., Rubber Chem. & Tech. 44, 1015 (1971)].

In general, the crystalline ethylene-propylene block copolymer has different properties depending upon the content, ethylene content and intrinsic viscosity of the room-temperature-p-xylene-soluble fraction. That is, a higher content of the room-temperature-p-xylene-soluble fraction in the crystalline ethylene-propylene block copolymer gives higher impact resistance but lower stiffness. When the content of the room-temperature-p-xylene-soluble fraction is constant, a lower ethylene content of the fraction gives higher strength and less flow marks, and a higher ethylene content of the fraction gives higher impact resistance and lower luster. When the ethylene content of the room-temperature-p-xylene-soluble fraction is constant, a higher intrinsic viscosity of the fraction gives less flow marks and better appearance. This relationship of intrinsic viscosity and flow marks is more striking as the ethylene content of the fraction is lower, and this is attributable to the fact that a room-temperature-p-xylene-soluble fraction of lower ethylene content is more soluble in the polypropylene component.

As is appreciated from the above explanation, the component (A) contained in the present resin composition is a component used to allow the composition to have improved strength and flow marks; and the component (B) is a component used to allow the composition to have improved impact resistance and luster.

When the room-temperature-p-xylene-soluble fraction Ac of the component (A) has an ethylene content of less than 15% by weight, the resulting resin composition has significantly low impact resistance; and when the fraction Ac has an ethylene content of more than 26% by weight, the resulting resin composition shows insufficient improvement in flow marks. Also when the fraction Ac has an intrinsic viscosity of less than 6 dl/g, the resulting resin composition shows insufficient improvement in flow marks.

When the room-temperature-p-xylene-soluble fraction Bc of the component (B) has an ethylene content of less than 27% by weight, the resulting resin composition has high luster and insufficient impact resistance. The resin composition has insufficient impact resistance also when the fraction Bc has an ethylene content of more than 50% by weight. When the fraction Bc has an intrinsic viscosity of more than 4 dl/g, the resulting resin composition comes to contain a polymer gel, resulting in reduced impact resistance.

The weight ratios As and Bs of the room-temperature-p-xylene-soluble fractions Ac and Bc to the total weight of the components (A) and (B) are required to satisfy the following formula:

$$As+Bs=7-15\% \text{ by weight,}$$

preferably 9–13% by weight
When (As+Bs) is less than 7% by weight, or more than 15% by weight, the resulting resin composition has no sufficient impact resistance or stiffness when used in automobile interior parts.

As and Bs are also required to satisfy the following formula:

$$As/(As+Bs)=0.1-0.6,$$

preferably 0.3–0.5
When As/(As+Bs) is less than 0.1, the resulting resin composition shows no improvement in flow marks; when As/

(As+Bs) is more than 0.6, the resulting resin composition has low impact resistance and high luster. Therefore, in any of these cases, the composition is not suitable for use in automobile interior parts.

The crystalline ethylene-propylene block copolymer can be produced by, for example, a process which comprises reacting, in the above-mentioned second polymerization step, ethylene and propylene in two stages in different compositions to obtain two different E/P copolymer rubbers, or a process which comprises installing, in the second polymerization step, a plurality of reactors and reacting ethylene and propylene in the reactors in different compositions to obtain a plurality of different E/P copolymer rubbers.

Alternatively, the crystalline ethylene-propylene block copolymer may be prepared by producing, by polymerization, two different crystalline ethylene-propylene block copolymers each containing a different E/P copolymer rubber and then blending the two copolymers in a given proportion.

The total content of the components (A) and (B) (i.e. the two crystalline ethylene-propylene block copolymers) in the present resin composition is 50–80% by weight, preferably 55–75% by weight. When the total content is less than 50% by weight, the resulting resin composition has insufficient flowability; and when the total content is more than 80% by weight, the resulting resin composition shows insufficient improvements in mechanical properties such as stiffness, impact resistance and the like.

The ethylene-α-olefin copolymer used as the component (C) in the present resin composition is preferably produced by the use of a single-site catalyst. In the present invention, there is used, as the single-site catalyst, a combination of (a) a metallocene compound of a group IV or V transition metal and (b) an orgnaoaluminum compound and/or an ionic compound. Preferred as the group IV or V transition metal are titanium (Ti), zirconium (Zr), hafnium (Hf), vanadium (V), etc.

As the metallocene compound, there can be used any known metallocene compound, for example, a metallocene compound having, as at least one ligand, a cyclopentadienyl group, a substituted cyclopentadienyl group [e.g. an alkyl (e.g. methyl, dimethyl or pentamethyl)-substituted cyclopentadienyl group, an indenyl group or a fluorenyl group], a group obtained by crosslinking of the above cyclopentadienyl group with a hydrocarbyl group (e.g. alkylene or substituted alkylene), a hydrocarbylsilicon group (e.g. silanylene, substituted silanylene, silalkylene or substituted silalkylene) or the like, or a group obtained by crosslinking of a cyclopentadienyl group with oxygen, nitrogen or phosphorus atoms (e.g. an oxasilanylene group, a substituted oxasilanylene group, an oxasilalkylene group, an aminosilyl group, a mono-substituted aminosilyl group, a phosphinosilyl group or a mono-substituted phosphinosilyl group).

Specific examples of the above metallocene compounds include those metallocene compounds described in Japanese Patent Application Kokai (Laid-Open) Nos. 58-19309, 60-35006, 61-130314, 61-264010, 61-296008, 63-222177, 63-251405, 1-66214, 1-74202, 1-275609, 1-301704, 1-319489, 2-41303, 2-131488, 3-12406, 3-139504, 3-179006, 3-185005, 3-188092, 3-197514, 3-207703 and 5-209013, and National Publication of International Patent Application Nos. 1-501950, 1-502036 and 5-505593.

As the single-site catalysts other than mentioned above, there can be cited those metallocene compounds described in Japanese Patent Application Kokai (Laid-Open) Nos. 61-180314, 63-142004, 1-129004, 2-75605, 3-12407, 4-227708, 4-268308, 4-300887, 6-25343, etc.

These metallocene compounds have a crosslinked and/or multi-substituted ligand(s) per se capable of forming a complex having a $C_2$ element of symmetry. Specific examples thereof include silicon-crosslinked type metallocene compounds such as dimethylsilyl(2,4-dimethylcyclopentadienyl)-(3',5'-dimethylcyclopentadienyl)zirconium dichloride, dimethylsilyl (2,4-dimethylcyclopentadienyl)(3',5'-dimethylcyclo-pentadienyl)hafnium dichloride and the like; and indenyl-crosslinked type metallocene compounds such as ethylenebisindenylzirconium dichloride, ethylenebisindenylhafnium dichloride, ethylenebis(methylindenyl) zirconium dichloride, ethylenebis (methylindenyl)hafnium dichloride and the like.

The organoaluminum compound used in combination with the metallocene compound includes a straight-chain or cyclic polymer represented by general formula $[-Al(R)O-]_n$ (wherein Rs are hydrocarbon groups having 1–10 carbon atoms and part of them may have substituents of a halogen atom(s) and/or a RO group(s); and n is a polymerization degree and is a 5 or more, preferably 10 or more). Specific examples thereof are methylalumoxane, ethylalumoxane and isobutylalumoxane having, as the R of the above formula, a methyl group, an ethyl group and an isobutyl group, respectively.

Other organoaluminum compounds include a trialkylaluminum, a dialkylhalogenoaluminum, a sesquialkylhalogenoaluminum, an alkenylaluminum, a dialkylhydroaluminum and a sesquialkylhydroaluminum. Specific examples thereof are trialkylaluminums such as trimethylaluminum, triethylaluminum, triisobutylaluminum, trihexylaluminum, trioctylaluminum and the like; dialkylhalogenoaluminums such as dimethylaluminum chloride, diethylaluminum chloride and the like; sesquialkylhalogenoaluminums such as sesquimethylaluminum chloride, sesquiethylaluminum chloride and the like; ethylaluminum dichloride; diethylaluminum hydride; and sesquiethylaluminum hydride. These organoaluminum compounds can be used in combination with the above-mentioned aluminum oxy compounds.

The ionic compound includes a compound represented by general formula $C^+A^-$. $C^+$ is an oxidizing cation of organic compound, organometal compound or inorganic compound, or a proton acid composed of a Lewis base and proton, and can form a metallocene cation by reacting with the anion of metallocene ligand.

$A^-$ is a bulky anion having no coordinating property and can stabilize the metallocene cation without coordinating to the metallocene.

As the ionic compound, there can be used those described in Japanese Patent Application Kokai (Laid-Open) Nos. 4-253711 and 4-305585 and National Publications of International Patent Application NOS. 5-507756 and 5-502906.

Particularly preferred is an ionic compound between tetrakis(pentafluorophenyl) borate and triphenylcarbonium cation or dialkylaluminum cation. The ionic compound can be used in combination with the organoaluminum compound.

The copolymerization of ethylene and α-olefin by the use of the single-site catalyst can be conducted by various well-known processes such as gas-phase polymerization of fluidized bed type or stirring type in inert gas, slurry polymerization in inactive solvent, bulk polymerization using monomers as solvent, and the like.

The polymerization temperature is ordinarily 10–150° C., preferably 20°–90° C.; and the polymerization time is ordinarily 0.1–10 hours.

When a metallocene compound and an orgnaoaluminum compound are used as the single-site catalyst for production of an ethylene-α-olefin copolymer, the molar ratio of the aluminum atom of the organoaluminum compound and the transition metal atom of the metallocene compound is ordinarily 10–100,000, preferably 10–1,000.

In the above combination for the single-site catalyst, the organoaluminum compound may be replaced by an ionic compound or by an ionic compound and an orgnaoaluminum compound. The molar ratio of the ionic compound and the transition metal atom of the metallocene compound is ordinarily 0.1–50, preferably 0.5–5.

The component (C) used in the present resin composition has a molecular weight distribution (Mw/Mn) of 2.5 or less. When the molecular weight distribution (Mw/Mn) is more than 2.5, the component (C) has low compatibility with the components (A) and (B) and the resulting resin composition inevitably has low impact resistance.

Mw indicates a weight average molecular weight, and Mn indicates a number average molecular weight.

The component (C) has a melt flow ratio ($MI_{10}/MI_{2.16}$) of 6–15. $MI_{10}$ is a melt index measured at 190° C. under a 10-kg load and $MI_{2.16}$ is a melt index measured at 190° C. under a 2.16-kg load. When the melt flow ratio ($MI_{10}/MI_{2.16}$) is less than 6, the resulting resin composition has low impact resistance; and when the melt flow ratio is more than 15, the composition has inferior flowability.

The α-olefin of the component (C), i.e. the ethylene-α-olefin copolymer is a 1-olefin having 3–12 carbon atoms. The proportion of the α-olefin in the copolymer is 70 mole % or less, preferably 50 mole % or less. When the proportion is more than 70 mole %, the resulting resin composition has inferior flowability, low stiffness and low resistance to heat deformation.

The content of the component (C) in the present resin composition is 5–20% by weight, preferably 7–18% by weight. When the content is less than 5% by weight, the resulting resin composition shows no improvement in impact resistance; and when the content is more than 20% by weight, the composition has strikingly low stiffness and resistance to heat deformation.

As long as the properties of the present polypropylene resin composition are not impaired, the component (C) may be used in combination with a known rubber component such as elastomer (e.g. ethylene-α-olefin copolymer or hydrogenated styrene-butadiene block copolymer), hydrogenated polybutadiene type block copolymer or the like, which is produced using an ordinary vanadium or titanium catalyst.

The talc used as the component (D) in the present resin composition has an average particle diameter of 3–7 μm, preferably 3–5 μm as measured by laser diffraction. A talc having an average particle diameter of less than 3 μm has a small average aspect ratio and the resulting resin composition shows small improvement in stiffness. When the average particle diameter is more than 7 μm, the resulting resin composition has low impact resistance and shows small improvement in stiffness.

The average particle diameter of talc was measured by formula of Fraunhofer diffraction for forward scattering of laser beam and diffraction formula of intensity for side scattering of halogen beam by the use of a micro track particle size distribution tester (7995-40DRA, a product of Nikkiso Co., Ltd.).

The content of the component (D) in the present resin composition is 15–30% by weight, preferably 15–25% by weight. When the content is less than 15% by weight, the resulting resin composition has small improvement in stiffness; and when the content is more than 30% by weight, the composition has low flowability and moldability and generates flow marks, giving a molded article of inferior appearance.

The talc used in the present resin composition can be produced by grinding a talc ore by the use of a known crusher such as roll mil, crusher or the like until an intended average particle diameter is obtained, and then removing those particles whose diameters are outside the average particle diameter of 3–7 μm by the use of a known dry classifier. Alternatively, classification may be conducted while conducting regrinding by the use of a known grinder.

The talc used in the present resin composition may have been subjected to a surface treatment using an appropriate treating agent, as long as the talc functions as desired. The surface treatment includes, for example, chemical or physical surface treatment using a treating agent of silane coupling agent type, higher fatty acid type, fatty acid metal salt type, unsaturated organic acid type or its derivative type, organic titanate type, resin acid type or the like.

The polypropylene resin composition of the present invention, constituted by the above-mentioned components (A), (B), (C) and (D) has a melt flow rate (230° C. under a load of 2,160 g) of 25 g/10-min or more, preferably 25–50 g/10-min. A resin composition having a melt flow rate of smaller than 25 g/10-min has insufficient flowability and shows no improvement in moldability.

The polypropylene resin composition of the present invention can be produced by blending the crystalline ethylene-propylene block copolymers [the components (A) and (B)], the ethylene-α-olefin copolymer [the component (C)] and talc [the component (D)] in the above-mentioned proportions by the use of a known means such as Henschel mixer, V-blender, ribbon blender or the like, melt-kneading the resulting blend by the use of, for example, a single-screw extruder, a twin-screw extruder, a twin-screw extruder having, in addition to an ordinary raw material inlet, another raw material inlet at the cylinder, a kneader or a Banbury mixer, and pelletizing the melt-kneaded material.

In order for the molded article produced from the present resin composition to have higher properties or properties specially required depending upon the applications, it is possible to add, to the present resin composition during or after the blending of components, various additives such as antioxidant, ultraviolet absorber, light stabilizer, pigment, dispersing agent, coatability improver, moldability improver, antistatic agent, lubricant, nucleating agent, releasant and the like. Addition of, in particular, antioxidant, ultraviolet absorber, light stabilizer, pigment, etc. is desirable.

The antioxidant includes 2,6-ditertiarybutylphenol, 2,6-ditertiarybutyl-4-ethylphenol, 2,6-ditertiarybutyl-4-n-butylphenol, 2,6-ditertiarybutyl-α-dimethylamino-p-cresol, 6-(4-hydroxy-3,5-ditertiarybutylaniline)-2,4-bisoctyl-thio-1,3,5-triazine, n-octadecyl 3-(4'-hydroxy-3',5'-ditertiarybutylphenyl)propionate, tris-(2-methyl-4-hydroxy-5-tertiary-butylphenyl)butane, tetrakis-[methylene 3-(3Y,5'-ditertiarybutyl-4'-hydroxyphenyl)propionate]methane, 1,3,5-trimethyl-2,4,6-tris(3,5-ditertiarybutyl-4-hydroxybenzyl) benzene, dilauryl thiodipropionate, etc.

The ultraviolet absorber and the light stabilizer include 2-hydroxy-4-n-octoxybenzophenone, 2-hydroxy-4-octadecylbenzophenone, 4-dodecyloxy-2-hydroxybenzophenone, 2-(2'-hydroxy-3'-tertiarybutyl-5'-methylphenyl)-5-chlorobenzotriazole, bis(2,2,6,6-tetramethyl-4-piperidyl) sebacate, a condensate between 1,2,3,4-butanetetracarboxylic acid and 1,2,2,6,6-pentamethyl-4-piperidinoltridecyl alcohol, etc.

The present invention is hereinafter described in more detail by way of Examples. However, the present invention is in no way restricted to these Examples.

In the Examples, measurement of properties was made as follows. Incidentally, each test piece used in measurement of mechanical properties was produced by conducting injection molding using an injection molding machine (J100SAII, a product of The Japan Steel Works, Ltd.), under the conditions of cylinder temperature=230° C. and die temperature=40° C.

(1) Melt flow rate (MFR)
Measured in accordance with the method specified by ASTM D 1238.
(2) Tensile break elongation (TBE)
Measured in accordance with the method specified by ASTM D 638.
(3) Flexural modulus (FM) Measured in accordance with the method specified by ASTM D 790.
(4) Heat distortion temperature (HDT) Measured in accordance with the method specified by ASTM D 648. The fiber stress applied was 18.5 kg/cm².
(5) Surface hardness (RH) Measured in accordance with the method specified by ASTM D 685. The steel ball used was R, and surface hardness was expressed by R scale.
(6) Izod impact strength (Izod) Measured in accordance with the method specified by ASTM D 256. The measurement temperature was 23° C.
(7) Brittleness temperature (BT) Measured in accordance with the method specified by ASTM D 746.
(8) Generation of flow marks
Flow marks are repeated wavy (or stripe-shaped) unevennesses which appear on a sample flowing in a die, in a direction normal to the flow direction of the sample (in this case, the die surface is not faithfully transferred on the sample surface), and generate strain of micro-order on the molded article obtained. Generation (%) of flow marks was determined by subjecting a sample to injection molding using a die (for measurement of resin flow length) having a spiral flow path of 3 mm (thickness)×10 mm (width)×2,000 mm (length), measuring the flow length of sample at which the sample showed the first flow mark, and calculating the ratio (%) of the flow length having flow marks to the total flow length.
(9) Luster
A flat test piece of 3 mm (thickness)×75 mm×150 mm was produced by injection molding using a die having a mirror surface interior. The injection molding was conducted using a molding machine (M1000SJ, a product of Meiki Co., Ltd.) under the conditions of cylinder temperature=210° C. and die temperature=40° C. The luster of the test piece was measured at the center of the test piece by the use of a digital variable angle gloss meter (VG-1D, a product of Nippon Denshoku Co., Ltd.) in accordance with JIS Z 8741 Method-2 (light-incident angle: 60°, light-receiving angle: 60°).

The components used in Examples and Comparative Examples had the following properties.

Components (A): crystalline ethylene-propylene block copolymers

TABLE 1

|  | PP-A1 | PP-A2 | PP-A3 | PP-A4 | PP-A5 | PP-A6 |
|---|---|---|---|---|---|---|
| MFR (g/10-min)* | 50 | 49 | 51 | 50 | 52 | 25 |
| mmmm (%) | 97.8 | 97.9 | 97.9 | 97.8 | 98.0 | 97.9 |
| Room-temperature-p-xylene-soluble fraction Ac (wt. %) | 11 | 10 | 11 | 11 | 5 | 11 |
| Ethylene content of fraction Ac (wt. %) | 20 | 28 | 13 | 20 | 20 | 20 |
| Inherent viscosity of fraction Ac (dl/g) | 8.5 | 8.1 | 8.2 | 4.0 | 8.0 | 8.5 |

*Measured at 230° C. under a load of 2,160 g.

Components (B): crystalline ethylene-propylene block copolymers

TABLE 2

|  | PP-B1 | PP-B2 | PP-B3 | PP-B4 | PP-B5 |
|---|---|---|---|---|---|
| MFR (g/10-min)* | 55 | 50 | 52 | 51 | 25 |
| mmmm (%) | 98.1 | 97.9 | 98.0 | 98.0 | 97.9 |
| Room-temperature-p-xylene-soluble fraction Bc (wt. %) | 12 | 11 | 11 | 5 | 10 |
| Ethylene content of fraction Bc (wt. %) | 30 | 52 | 29 | 31 | 29 |
| Inherent viscosity of fraction Bc (dl/g) | 3.5 | 3.5 | 7.5 | 4.1 | 3.1 |

*Measured at 230° C. under a load of 2,160 g.

Components (C): ethylene-α-olefin copolymers
R-1: an ethylene-octene copolymer obtained by polymerization using a single-site catalyst, having a melt index (190° C.) of 5, a molecular weight distribution (Mw/Mn) of 2.1, a melt flow ratio ($MI_{10}/MI_{2.16}$) of 7.2 and an octene-1 content of 7.3 mole %.
R-2: an ethylene-hexene copolymer obtained by polymerization using a single-site catalyst, having a melt index (190° C.) of 3, a molecular weight distribution (Mw/Mn) of 2.0, a melt flow ratio ($MI_{10}/MI_{2.16}$) of 7.1 and a hexene-1 content of 11.5 mole %.
R-3: an ethylene-butene copolymer obtained by polymerization using an ordinary vanadium catalyst, having a melt index (190° C.) of 1.5, a molecular weight distribution (Mw/Mn) of 2.1, a melt flow ratio ($MI_{10}/MI_{2.16}$) of 5.5 and a butene-1 content of 14.3 mole %.
R-4: an ethylene-propylene copolymer obtained by polymerization using an ordinary vanadium catalyst, having a melt index (190° C.) of 0.5, a molecular weight distribution (Mw/Mn) of 2.2, a melt flow ratio ($MI_{10}/MI_{2.16}$) of 5.4 and a propylene content of 16.6 mole %.
Components (D): talcs
T-1: a talc having an average particle diameter of 4 μm.
T-2: a talc having an average particle diameter of 8 μm.
(Each is a classified talc produced by Calceed Co.)

[Examples 1–4 and Comparative Examples 1–14]

The components (A) to (D) shown in Tables 3 and 4 were compounded according to the formulations shown in Tables 3 and 4. Thereto were added the following antioxidant, light stabilizer and pigment, after which were conducted mixing by a tumbler, melt-kneading by a twin-screw extruder and pelletization.

As the antioxidant, there were used 2,6-ditertiarybutyl-4-methylphenol and tetrakis-[methylene 3-(3',5'-ditertiarybutyl-4'-hydroxyphenyl)propionate]methane in amounts of 0.1 part by weight and 0.3 part by weight, respectively, based on 100 parts by weight of the mixture of the components (A) to (D).

As the light stabilizer, there was used bis-(2,2,6,6-tetramethyl-4-piperidyl) sebacate in an amount of 0.3 part by weight based on 100 parts by weight of the mixture of components (A) to (D).

As the pigment, there were used iron oxide and titanium oxide in amounts of 0.3 part by weight and 0.6 part by weight, respectively, based on 100 parts by weight of the mixture of the components (A) to (D).

The pellets obtained above were made into test pieces by the use of an injection molding machine. The test pieces were measured for properties. The results are shown in Tables 3 and 4.

TABLE 3

|  | Example 1 | Example 2 | Example 3 | Example 4 | Comparative example 1 | Comparative example 2 | Comparative example 3 | Comparative example 4 |
| --- | --- | --- | --- | --- | --- | --- | --- | --- |
| Component (A) (wt. %) | PP-A1 (27) | PP-A1 (20) | PP-A1 (33) | PP-A1 (27) | PP-A1 (66) | — | PP-A2 (66) | PP-A1 (27) |
| Component (B) (wt. %) | PP-B1 (39) | PP-B1 (46) | PP-B1 (33) | PP-B1 (39) | — | PP-B1 (66) | — | PP-B2 (39) |
| Component (C) (wt. %) | R-1 (14) | R-1 (14) | R-1 (14) | R-2 (14) | R-1 (14) | R-1 (14) | R-1 (14) | R-1 (14) |
| Component (D) (wt. %) | T-1 (20) | T-1 (20) | T-1 (20) | T-2 (20) | T-1 (20) | T-1 (20) | T-1 (20) | T-1 (20) |
| MFR*[1] of mixture of components (A) and (B) (g/10-min) | 52 | 53 | 52 | 52 | 50 | 55 | 49 | 50 |
| As + Bs | 11.6 | 11.7 | 11.5 | 11.6 | 11.0 | 12.0 | 10.0 | 11.0 |
| As/(As + Bs) | 0.39 | 0.28 | 0.48 | 0.39 | 1.0 | 0 | 1.0 | 0.41 |
| MFR*[2] (g/10-min) | 34 | 33 | 32 | 29 | 35 | 31 | 30 | 35 |
| TBE (%) | >400 | >400 | >400 | >400 | >400 | 220 | 180 | 110 |
| FM (MPa) | 2650 | 2680 | 2630 | 2670 | 2630 | 2690 | 2640 | 2680 |
| Izod (J/m) | 450 | 400 | 480 | 440 | 480 | 290 | 230 | 180 |
| HDT (°C.) | 88 | 87 | 89 | 87 | 90 | 81 | 87 | 84 |
| RH (R scale) | 80 | 79 | 81 | 80 | 83 | 69 | 80 | 77 |
| BT (°C.) | −6.5 | −7.3 | −5.1 | −6.0 | +5.8 | −7.8 | −4.8 | +2.3 |
| Generation of flow marks (%) | 25 | 30 | 25 | 30 | 20 | 90 | 35 | 40 |
| Luster (%) | 45 | 43 | 47 | 41 | 69 | 39 | 49 | 41 |

*[1]Measured at 230° C. under a load of 2,160 g. In Comparative Examples 1–3, refers to the MFR of the component (A) or (B) alone.
*[2]Measured at 230° C. under a load of 2,160 g.

TABLE 4

| Comparative example | 5 | 6 | 7 | 8 | 9 | 10 | 11 | 12 | 13 | 14 |
| --- | --- | --- | --- | --- | --- | --- | --- | --- | --- | --- |
| Component (A) (wt. %) | PP-A1 (27) | PP-A3 (27) | PP-A4 (27) | PP-A5 (27) | PP-A6 (27) | PP-A1 (27) | PP-A1 (27) | PP-A1 (27) | PP-A1 (6) | PP-A1 (54) |
| Component (B) (wt. %) | PP-B3 (39) | PP-B1 (39) | PP-B1 (39) | PP-B4 (39) | PP-B5 (39) | PP-B1 (39) | PP-B1 (39) | PP-B1 (39) | PP-B1 (60) | PP-B1 (12) |
| Component (C) (wt. %) | R-1 (14) | R-1 (14) | R-1 (14) | R-1 (14) | R-1 (14) | R-3 (14) | R-4 (14) | R-1 (14) | R-1 (14) | R-1 (14) |
| Component (D) (wt. %) | T-1 (20) | T-1 (20) | T-1 (20) | T-1 (20) | T-1 (20) | T-1 (20) | T-1 (20) | T-2 (20) | T-1 (20) | T-1 (20) |
| MFR*[1] of mixture of components (A) and (B) (g/10-min) | 51 | 53 | 53 | 51 | 25 | 52 | 52 | 52 | 54 | 51 |
| As + Bs | 11.0 | 11.6 | 11.6 | 5.0 | 10.4 | 11.6 | 11.6 | 11.6 | 11.9 | 11.2 |
| As/(As + Bs) | 0.41 | 0.39 | 0.39 | 0.39 | 0.43 | 0.39 | 0.39 | 0.39 | 0.08 | 0.80 |
| MFR*[2] (g/10-min) | 28 | 30 | 29 | 32 | 13 | 28 | 29 | 30 | 31 | 28 |
| TBE (%) | 50 | >400 | >400 | 250 | >400 | 280 | 330 | 380 | 240 | >400 |
| FM (MPa) | 2660 | 2610 | 2560 | 2700 | 2630 | 2580 | 2660 | 2590 | 2680 | 2640 |
| Izod (J/m) | 150 | 470 | 540 | 120 | 550 | 160 | 190 | 400 | 300 | 460 |
| HDT (°C.) | 89 | 89 | 85 | 91 | 87 | 82 | 89 | 85 | 82 | 89 |
| RH (R scale) | 81 | 80 | 76 | 85 | 77 | 73 | 81 | 79 | 70 | 82 |
| BT (°C.) | +7.2 | +8.1 | −3.5 | +6.8 | −8.5 | −3.8 | +4.2 | −4.1 | −5.8 | +1.9 |
| Generation of flow marks (%) | 20 | 25 | 70 | 50 | 32 | 28 | 25 | 30 | 82 | 23 |
| Luster (%) | 40 | 47 | 53 | 61 | 41 | 45 | 52 | 45 | 40 | 60 |

*[1], *[2]: Measured at 230° C. under a load of 2,160 g.

As is appreciated from Tables 3 and 4, as compared with Examples of the present invention, Comparative Examples 1 and 8 have high brittleness temperatures and, moreover, have high luster and inferior appearance quality; and Comparative Examples 2, 7 and 13 have a high generation (%) of flow marks and consequently inferior appearance quality. Comparative Examples 3, 4 and 5 are inferior in Izod impact strength and tensile break elongation; and Comparative Example 6 has a very high brittleness temperature. Comparative Example 9 is very inferior in flowability (too low a melt flow rate) and consequently has poor moldability; and Comparative Examples 10 and 11 are inferior in Izod impact strength. Comparative Example 12 is inferior to Examples in nearly all the test items. Comparative Example 14 has too high luster and consequently poor appearance quality.

As described above, the polypropylene resin composition of the present invention is superior not only in mechanical properties such as stiffness, resistance to heat deformation, impact resistance and the like, but also in flowability (i.e. high flowability) and moldability. Moreover, the present resin composition can provide a molded article having a high-quality surface appearance which is very low in generation of flow marks as well as in luster. Therefore, the present resin composition can be suitably used in various automobile interior parts such as instrument panels, trims and the like, which require good moldability and high-quality surface appearance.

What is claimed is:

1. A polypropylene resin composition comprising the following components (A), (B), (C) and (D):

(A) a crystalline ethylene-propylene block copolymer containing a room-temperature-p-xylene-soluble fraction Ac having an ethylene content of 15–26% by weight and an intrinsic viscosity (measured at 135° C. in decalin) of 6 dl/g or more, (B) a crystalline ethylene-propylene block copolymer containing a room-temperature-p-xylene-soluble fraction Bc having an ethylene content of 27–50% by weight and an intrinsic viscosity (measured at 135° C. in decalin) of 4 dl/g or less, (C) an ethylene-α-olefin copolymer obtained by polymerization using a single-site catalyst, having a molecular weight distribution (Mw/Mn) of 2.5 or less, a melt flow ratio ($MI_{10}/MI_{2.16}$) of 6–15 (wherein $MI_{10}$ is a melt index measured at 190° C. under a load of 10 kg and $MI_{2.16}$ is a melt index measured at 190° C. under a load of 2.16 kg) and an α-olefin proportion of 70 mole % or less, and (D) a talc having an average particle diameter of 3–7 μm as measured by laser diffraction, in which composition (a) the weight ratios As and Bs of the room-temperature-p-xylene-soluble fractions Ac and Bc to the total weight of the components (A) and (B) satisfy the following formulas (1) and (2):

$$As+Bs=7-15\% \text{ by weight} \qquad (1)$$

$$As/(As+Bs)=0.1-0.6 \qquad (2)$$

(b) the polypropylene component contained in each of the components (A) and (B) has an isotactic pentad fraction (mmmm) of 96% or more, and the mixture of the components (A) and (B) has a melt flow rate (measured at 230° C. under a load of 2,160 g) of 30–70 g/10-min, (c) the total content of the components (A) and (B) is 50–80% by weight, the content of the component (C) is 5–20% by weight, and the content of the component (D) is 15–30% by weight, and (d) the composition comprising the components (A), (B), (C) and (D) has a melt flow rate (measured at 230° C. under a load of 2,160 g) of 25 g/10-min or more.

2. A polypropylene resin composition according to claim 1, wherein the component (A) contains a room-temperature-p-xylene-soluble fraction Ac having an ethylene content of 18–22% by weight.

3. A polypropylene resin composition according to claim 1, wherein the component (B) contains a room-temperature-p-xylene-soluble fraction Ac having an ethylene content of 27–35% by weight.

4. A polypropylene resin composition according to claim 1, wherein the weight ratios As and Bs of the room-temperature-p-xylene-soluble fractions Ac and Bc to the total weight of the components (A) and (B) satisfy the following formulas.

$$As+Bs=9-13\% \text{ by weight}$$

$$As/(As+Bs)=0.3-0.5$$

5. A polypropylene resin composition according to claim 1, wherein the total content of the components (A) and (B) is 55–75% by weight.

6. A polypropylene resin composition according to claim 1, wherein the content of the component (C) is 7–18% by weight.

7. A polypropylene resin composition according to claim 1, wherein the composition comprising the components (A), (B), (C) and (D) has a melt flow rate of 25–50 g/10-min.

* * * * *